(12) United States Patent
Newton

(10) Patent No.: US 12,072,463 B2
(45) Date of Patent: **\*Aug. 27, 2024**

(54) METHODS AND APPARATUS FOR A TUNNEL DETECTION SYSTEM

(71) Applicant: Frederick Lee Newton, Albuquerque, NM (US)

(72) Inventor: Frederick Lee Newton, Albuquerque, NM (US)

( \* ) Notice: Subject to any disclaimer, the term of this patent is extended or adjusted under 35 U.S.C. 154(b) by 0 days.

This patent is subject to a terminal disclaimer.

(21) Appl. No.: 17/972,251

(22) Filed: Oct. 24, 2022

(65) Prior Publication Data

US 2023/0056616 A1 Feb. 23, 2023

Related U.S. Application Data

(63) Continuation of application No. 16/901,952, filed on Jun. 15, 2020, now Pat. No. 11,480,703.

(60) Provisional application No. 62/861,872, filed on Jun. 14, 2019.

(51) Int. Cl.
*G01V 3/12* (2006.01)
*G01V 1/30* (2006.01)
*G01V 3/38* (2006.01)

(52) U.S. Cl.
CPC ............... *G01V 3/12* (2013.01); *G01V 1/301* (2013.01); *G01V 3/38* (2013.01)

(58) Field of Classification Search
CPC . G01V 3/12; G01V 3/17; G01V 3/081; G01V 3/38; G01V 1/301
See application file for complete search history.

(56) References Cited

U.S. PATENT DOCUMENTS

| 3,967,194 | A  | * | 6/1976  | Beaver  | G01N 27/82 346/33 P |
| 10,444,395 | B1 | * | 10/2019 | Vinegar | G01V 3/40 |
| 11,480,703 | B2 | * | 10/2022 | Newton  | G01V 1/301 |
| 2017/0097322 | A1 | * | 4/2017 | Giese | G01N 29/4436 |
| 2020/0041643 | A1 | * | 2/2020 | Kimchy | G01S 15/32 |
| 2020/0088684 | A1 | * | 3/2020 | Banks | F16L 55/40 |
| 2020/0116555 | A1 | * | 4/2020 | Brown | G01H 9/002 |

FOREIGN PATENT DOCUMENTS

| GB | 2266370 A | * 10/1993 | .............. F16L 55/28 |
| GB | 2266370 A | 10/1993 | |

\* cited by examiner

*Primary Examiner* — Manuel L Barbee

(57) ABSTRACT

Systems and methods are discussed to image lithological data within the strata beneath the earth surface, including a subterranean object detection system. The system may further comprise a pipeline operable to conduct a working fluid and an instrumented pig operable to travel within the pipeline and operable to image lithological strata and voids within the strata beneath and around the pipeline. The instrumented pig may comprise an outer case, a battery coupled to the outer case, a ground imaging unit operable to send a signal to image the lithological strata and voids within the strata beneath and around the pipeline and may be operable to receive a reflected signal indicating lithology data, wherein the ground imaging unit may be operably coupled to the battery.

19 Claims, 6 Drawing Sheets

METHODS AND APPARATUS FOR A TUNNEL DETECTION SYSTEM

CROSS-REFERENCE TO RELATED APPLICATION

This application is a continuation of pending U.S. patent application Ser. No. 16/901,952 filed Jun. 15, 2020, which claims the benefit of U.S. Provisional Patent Application No. 62/861,872 filed Jun. 14, 2019, which is incorporated herein in its entirety by reference.

BACKGROUND

Methods and apparatus are disclosed herein for a tunnel detection system. National borders and tactical perimeters must be defended against the threat of persons gaining illegal entry or those trying to transport drugs or contraband. Detecting hidden tunnels under the border perimeter has been largely unsuccessful. At many international borders, including the southern border of the United States with Mexico, fences and walls rising high above ground or electronic surveillance systems assisting border security agents in preventing illegal crossers will never stop 100 percent of the illegal entries into the United States. Between five and ten percent can still enter through an unknown number of tunnels under the border. The security of most all international borders throughout the world suffers from the same vulnerability.

SUMMARY

Embodiments of the invention include a subterranean object detection system. The system may comprise a pipeline operable to conduct a working fluid and an instrumented pig operable to travel within the pipeline and operable to image lithological strata and voids within the strata beneath and around the pipeline. The instrumented pig may comprise an outer case, a battery coupled to the outer case, a ground imaging unit operable to send a signal to image the lithological strata and voids within the strata beneath and around the pipeline and is operable to receive a reflected signal indicating lithology data, wherein the ground imaging unit is operably coupled to the battery.

Embodiments further include an instrumented pig, that may comprise an outer case, a rechargeable battery coupled to the outer case, an acoustic sub-bottom profiling unit operable to image lithology beneath and around the pig. The acoustic sub-bottom profiling unit may be operably coupled to the rechargeable battery. The acoustic sub-bottom profiling unit may comprise a transducer operable to produce an acoustic pulse directed to ground strata. The lithological features and voids within the strata may create a reflected acoustic pulse upon interacting with the acoustic pulse. The transducer of the acoustic sub-bottom profiling unit may be operable to receive the reflected acoustic pulse. The instrumented pig may further comprise waypoint detector operable to read and receive global positioning system data from an external waypoint.

Embodiments further include a method of detecting a subterranean object. The method may comprise broadcasting an acoustic signal from an acoustic sub-bottom profiler contained within an instrumented pig, the instrumented pig traveling within a pipeline. The method may further comprise receiving, at a receiver within the acoustic sub-bottom profiler, a reflected acoustic signal. The method may further comprise processing, at a signal processor, the reflected acoustic signal. The method may further comprise receiving from a magnetically coded waypoint, at a waypoint detector, a global positioning system location. The method may further comprise geocoding a processed lithology data with the GPS location.

The various embodiments described in the summary and this document are provided not to limit or define the disclosure or the scope of the claims.

DETAILED DESCRIPTION

Figure 1:
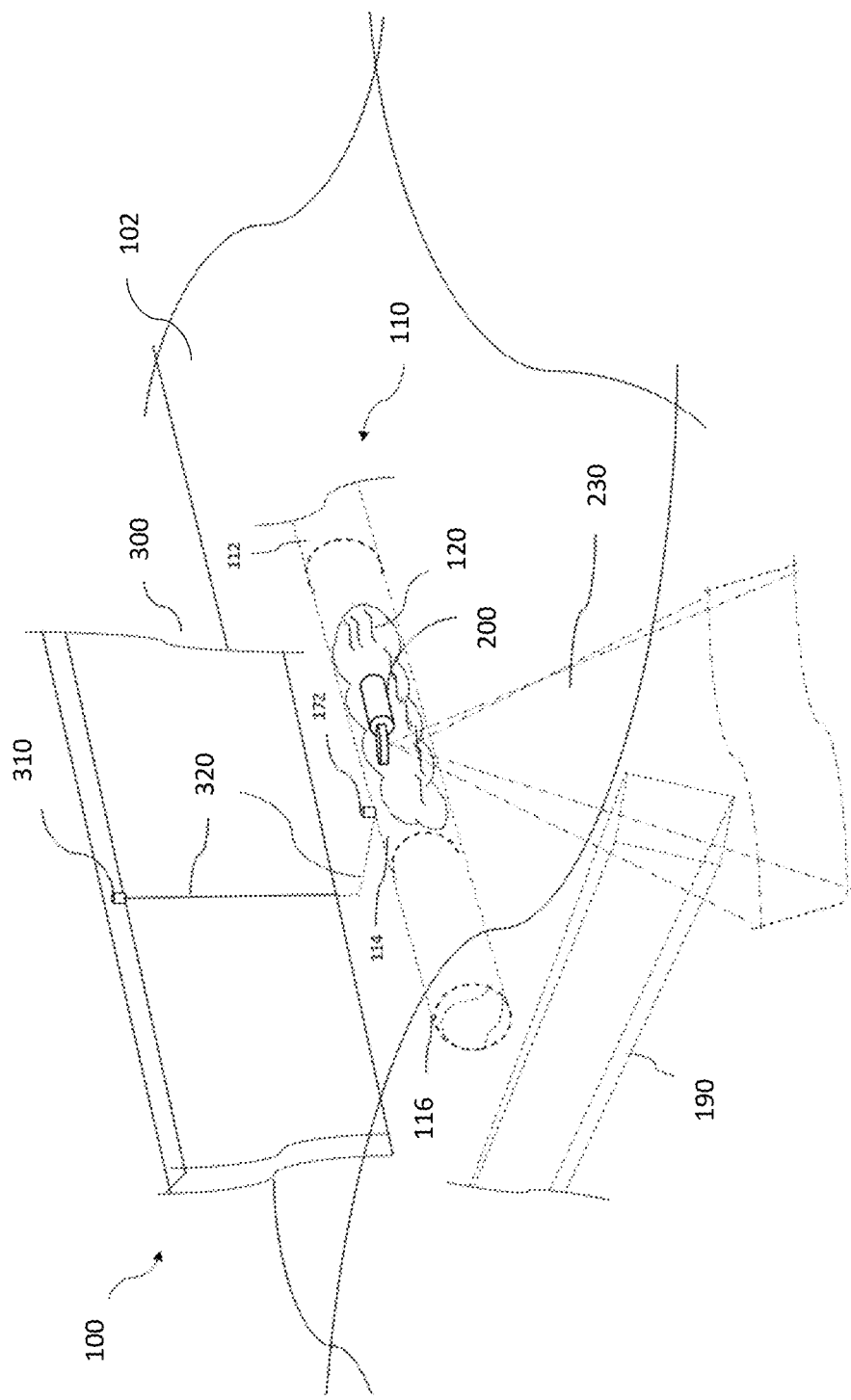
FIG. 1 is a view of a tunnel detection system as described herein.

Some embodiments include the subterranean object detection system 100 as shown in FIG. 1 The subterranean object detection system 100 may be operable to detect subterranean features, such as tunnels, which may be located near a border or a protected perimeter and may be used to subterraneously cross the border or perimeter. The subterranean object detection system 100 may gather and transmit data regarding any subterranean feature, including anomalous subterranean features, that have been detected by an external receiver operably coupled to a centrally located processing station, as will be discussed herein below.

Figure 3:
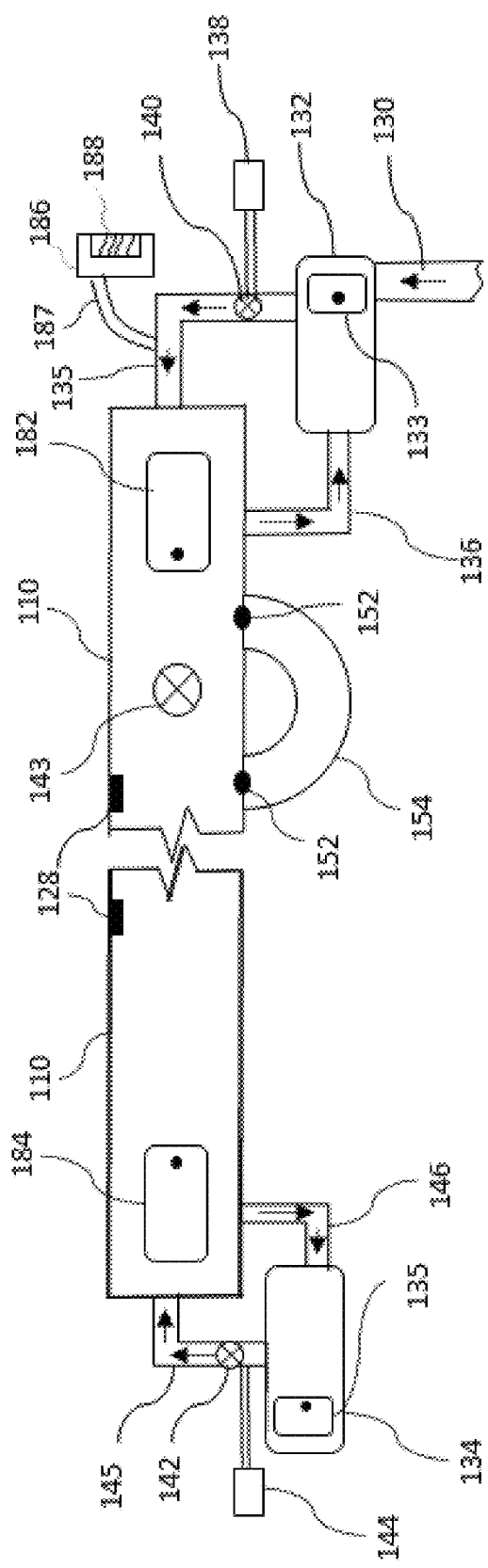
FIG. 3. is a magnified view of certain aspects of the tunnel detection system.

In some embodiments the subterranean object detection system 100 may comprise a pipeline 110, a cutout view of which is shown in FIG. 1. The pipeline 110 may be operable to contain a working fluid 120. The working fluid 120 may be supplied by a fluid supply 130, as shown in FIG. 3. The fluid supply 130 may be coupled to the pipeline 110. The working fluid 120 may be propelled through the pipeline 110 by a first pump 140, as shown in FIG. 3. The first pump 140 may be coupled to the fluid supply 130 at an inlet. The first pump 140 may further be connected to the pipeline 110 at a pump outlet, the pump outlet being operably connected to the pipeline 110.

Referring still to FIG. 1, in some embodiments, the pipeline 110 may be operable to accommodate an instrumented pig 200. In some embodiments, the instrumented pig 200 may project a ground imaging signal, such as a pulse of acoustic energy 230, as will be discussed in further detail below. The pulse of acoustic energy 230 may be operable to detect the presence of lithological features and voids, such as a tunnel 190. In further embodiments, a ground imaging signal may be created using a different technique or technology.

In some embodiments, the pipeline 110 may be adjacent to an above-ground barrier structure 300. In some embodiments, the above-ground barrier 300 may comprise a wall or a fence. The above-ground barrier structure 300 may be operable to support a transceiver 310.

Figure 2C:
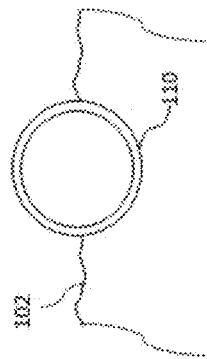
FIGS. 2a-2e are cross-sectional views of various aspects of the tunnel detection system as described herein.
Figure 2E:
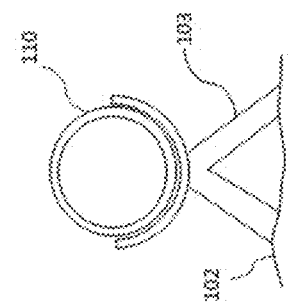
Figure 2B:
Figure 2D:
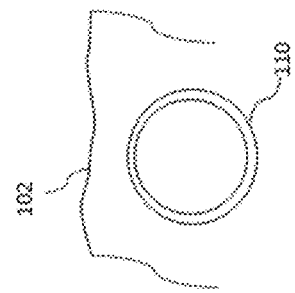
Figure 2A:

In some embodiments, the pipeline 110 may comprise a high-density polyethylene (HDPE) material. As shown in FIG. 2a, in some embodiments, the pipeline 110 may be laid on the surface of ground 102. As shown in FIG. 2b, in further embodiments, the pipeline 110 may be at least partially buried in the ground 102. As shown in FIG. 2c, in some embodiments, half of the pipeline 110 may be buried into the ground 102. As shown in FIG. 2d, the pipeline 110 may be completely buried in the ground 102.

As shown in these FIG. 2D, in some embodiments, the pipeline 110 may be completely buried in the ground 102. In some embodiments, the pipeline 110 may be buried by approximately three feet of overburden. The pipeline 110 may be buried three or more feet beneath the ground 102 over the length of the pipeline 110. Burying or partially burying the pipeline 110 may be of value in protecting the pipeline 110 from damage due to various causes, such as, for example: (1) malicious acts/intent of individuals to destroy, damage, or inhibit the pipeline 110 from performing its function, (2) exposure to accidental damage from surface vehicles and other equipment operated or controlled by people in the proximity of the pipeline 110, or (3) exposure to natural sunlight, especially ultraviolet light) temperature extremes, especially freezing temperatures. Any of these could reduce the working life cycle of the HDPE pipeline 110 to less than its optimal life, which may be approximately 30 years or more.

As shown in these figures, in some embodiments, between zero percent and fifty percent of the pipeline 110 may be buried in the ground 102. In further embodiments, between fifty percent and one hundred percent of the pipeline may be buried under the ground 102. In further embodiments, the entire pipeline 110 may be buried under the ground by as much overburden as three feet or more. In some embodiments, as shown in FIG. 2e, the pipeline 110 may be elevated off of the ground 102 and may be supported by a frame 103. The frame 103 may be anchored to the ground 102. The pipeline 110 may be coupled to the frame 103 using clamps, fasteners, or may rest in a U-shaped carrier as part of frame 103. In some embodiments, Referring again to FIG. 1, the pipeline 110 may, in some embodiments, comprise multiple sections, such as first section 112, second section 114, third section 116 to an nth section. The multiple sections may be coupled together, with a first section 112 of pipeline 110 being coupled to a second section 114 of the pipeline 110, with the second section 114 of the pipeline 110 being coupled to a third section 116 and so on with fourth, fifth, sixth and nth sections of the pipeline 110. In some embodiments, when the sections are joined together, the pipeline 110 may have a length ranging from 30-150 miles. Further, the pipeline 110 may have curves and corners as necessary to go around obstacles, such as physical obstacles, private property, or to surround a protected area, such as a military installation, building, or airport.

The pipeline 110 may be operable to accommodate the working fluid 120. The working fluid 120 may comprise any suitable fluid, such as, for example water, gasoline of any grade, oil of various viscosities, or other fluids that may comprise a low electrical conductivity and compressibility. The working fluid 120 may comprise any fluid of low viscosity that is not corrosive to the material of pipeline 110, such as HDPE.

Referring now to FIG. 3, which illustrates an overhead view of the ends of the pipeline 110, in some embodiments, the system 100 may comprise the working fluid supply 130. The working fluid supply 130 may comprise a supply line connected to a main supply, such as, for example, an existing supply system or a naturally occurring supply. In further embodiments, the supply 130 may comprise a first storage tank 132 located proximate to the pipeline 110. The first storage tank 132 may be positioned above the pipeline 110 such that the working fluid 120 is gravity fed to the pipeline 110. The first storage tank 132 may be filled by an existing pipeline system, or, alternatively, by a natural source. The first storage tank 132 may, in some embodiments, be manually filled using a truck with a tank or other means.

As discussed herein above, the system 100 may further comprise the first pump 140, operable to receive the working fluid 120 through the pipeline 110. The first pump 140 may further be operable to pump water into the pipeline 110. The pump 140 may be connected to a first control unit 138, the first control unit 138 being programmed to control how much fluid is pumped and for how long. The first control unit 138 may be a variable speed controller of the first pump 140 and may be able to control the speed and amount of fluid being pumped. The first control unit 138 may be programmed and operable to activate the first pump 140. In some embodiments, the first control unit 138 may be enabled to receive wired communications or wireless communications, such as a communications via a cellular network using 5G technology, from an external source to provide instruction to the first control unit 138 and the first pump 140. In further embodiments, the first pump 140 may be activated and deactivated by a float switch in the first storage tank 132, wherein the float switch may be operably connected to the first pump 140. Such a float switch may indicate a sufficient quantity of working fluid 120 present within the first storage tank 132 or an insufficient quantity of working fluid 120, which would deactivate the pump.

Referring still to FIG. 3, in further embodiments, the pipeline 110 may comprise a second storage tank 134 located at the end of pipeline 110. The second storage tank 134 may be operable to receive the working fluid 120 when it arrives at the end of the pipeline 110 via a fluid connection 146, which may comprise HDPE piping, metal piping, or rubber tubing, as is known in the art. The system 100 may further comprise a second pump 142. The second pump 142 may be coupled to the second storage tank 134 and to the pipeline 110 via tank connection 145, with fluid flowing in the direction indicated by the arrows of FIG. 3. The second pump 142 may be coupled to a second control unit 144. The second control unit 144 may be programmed and operable to activate the second pump 142. In some embodiments, the second control unit 144 may be enabled to receive wired communications or wireless communications from an external location to provide instruction to the second control unit 144 and the second pump 142. In further embodiments the second pump 142 may be activated or deactivated by a float switch in the second storage tank 134, the float switch being operably coupled to second pump 142. In some embodiments, the second storage tank 134 may comprise a door 135 operable to allow working fluid 120 to be replenished or removed, as necessary. The door 135 may be operable to accommodate working fluid 120 being replenished via truck, a local supply, treated water, or purification units for nearby rivers, lakes, etc. All electrical components may be powered by either a wired connection to a power station or by solar energy obtained via solar panels.

In some embodiments where the length of the pipeline 110 exceeds 40 miles and may approach an overall length of 80 miles or more, an intermediate third pump 143 may be required to compensate for pressure losses from friction between the working fluid 120 and the inner wall of the pipeline 110. The first control unit 138 and/or the second control unit 144 may have telemetered controls for the operation of the intermediate third pump 143. Whenever the instrumented pig 160 approaches the intermediate third pump 143, valves 152 may be opened to divert the instrumented pig 200 to connected line 154 and to redirect the instrumented pig to pipeline 110. The valves 152 may be automatically opened and closed to bypass the intermediate third pump 143. The valves 152 may be operably coupled to the first control unit 138 or to the second control unit 144 and may have a wired power connection to solar panels or to another power source.

In some embodiments, once the instrumented pig 200 has arrived at the end of pipeline 110 and a sufficient amount of working fluid 120 has been deposited in the second storage tank 134, the working fluid 120 may be pumped back to the first storage tank 132, as will be described herein below.

Referring still to FIG. 3, the pipeline 110 may comprise a first access panel 182. In some embodiments, the first access panel 182 may be operable to be opened and closed and may be sealed shut so as to prevent the leakage of any fluid or the entry of any foreign objects into the pipeline 110. When the first access panel 182 is open, the instrumented pig 200 may be inserted into the pipeline 110 through the opening created when access panel 182 is in an open position.

Referring still to FIG. 3, in some embodiments, the pipeline 110 may further comprise a second access panel 184 located distally from first access panel 182 and located at the "end" of the pipeline 110. In some embodiments, the second access panel 184 may be operable to be opened and closed and may be sealed shut so as to prevent the leakage of any fluid or the entry of any foreign objects into the pipeline 110. In some embodiments, when the instrumented pig 200 has reached the end of pipeline 110 at or near the second access panel 184, the instrumented pig 200 may be removed from the pipeline 110 via the second access panel 184, either manually or via automated robotic means, and placed back into the pipeline 110 via the opening created when the second access panel 184 is in an open position.

The second access panel 184 may comprise a pig catcher coupled to the inside of second access panel 184. The pig catcher may be operable to catch a moving pig. The pig catcher may comprise a rigid meshed net, or may comprise a flexible meshed net, allowing the water to pass through the mesh. The pig catcher may be raised out of the pipeline when the second access panel 184 is opened, thereby removing the instrumented pig as well. The first access panel 184 may comprise a similar pig catcher.

As discussed herein above, the second pump 142 may be activated by either the second control unit 144 or the float valve, or may be activated by the second control unit and interlocked by the float valve, when sufficient working fluid 120 has been deposited into the second storage tank 134. When the second pump 142 is activated, the second pump 142 may pump the working fluid 120 toward the beginning of the pipeline 110 and thereby propel the instrumented pig 200 in the opposite direction to the beginning of the pipeline 110 at or near the first access panel 182 of the pipeline 110. As the working fluid 120 flows back to this area, the first storage tank 132 may fill with working fluid 120 via fluid connection 136. The instrumented pig 200 may be removed from the pipeline 110 via the first access panel 182, either manually or via automated robotic means, and placed back into the pipeline 110 via the opening created when the first access panel 182 is in an open position. The first pump 140 may be activated by either the first control unit 138 or the float valve when sufficient working fluid 120 has been deposited into the first storage tank 132. When the first pump 140 is activated, the first pump 140 may pump the working fluid 120 toward the end of the pipeline 110 and thereby propel the instrumented pig 200 to the end of the pipeline 110 at or near the second access panel 184 of the pipeline 110. This process may be repeated each time the instrumented pig 200 reaches the first access panel 182 or adjacent thereto or the second access panel 184 or adjacent thereto. The instrumented pig 200 may travel at a rate of approximately 10 feet per second.

In some embodiments, the system 100 may be duplicated to provide detection coverage over large distances, such as, for example, national borders, In such embodiments, a second detection system, similar to system 100, may be located end-to-end with system 100. In such embodiments, the second storage tank 132 may be used as a supply for the working fluid to the second system.

Referring again to FIG. 3, in some embodiments, the working fluid 120 may comprise water and the pipeline 110 may comprise a watering station 186. The watering station 186 may comprise a water treatment apparatus 188, such as, for example, a water filter, a chemical treatment, an ultraviolet light treatment, or combination of these. The watering station 186 may comprise a faucet or drinking fountain or other means to extract that may be used for human consumption. The watering station 186 may comprise multiple faucets or drinking fountains.

The watering station 186 may be located 70 to 100 feet or more from the pipeline 110, from which a small pipeline 187 of only ½ inch to ¾ inch diameter may be tapped into the pipeline 110 and carry the water to the watering station 186. In many border areas, which may be far removed from populations centers, watering stations 186 may act as natural gathering areas and may enable identification of people in the area by capturing facial features and vocal features via related artificial intelligence system and identification software.

As mentioned herein above, in some embodiments, a working fluid 120 may comprise water. In certain applications, the system 100 may be used to detect lithological strata such as tunnel 190, as illustrated in FIG. 1. The system 100 may be used in connection with new or existing tunnels across borders or perimeters intended to protect national borders from illegal entry or departure of unauthorized individuals or contraband. The system 100 may further be used in connection with new or existing tunnels across borders or perimeters intended to protect or across perimeters of protected assets, such as, for example, military bases, airports, nuclear power plants, banks, courts, schools, universities, or any valued asset or across perimeters guarding against potential threats, such as criminal elements in penal institutions. In applications involving national borders, it may be of benefit for the pipeline 110 to make available treated potable water. This may be available in regions where there is little potable water available and where government agents or others may be visiting and may be in need of potable water.

Referring again to FIG. 3, in some embodiments, the system 100 may comprise first storage tank 132. In some embodiments, the first storage tank 132 may be operably coupled to the fluid supply 130. In some embodiments, the tank 132 may be filled manually via door 133. Such manually filling may be done via a supply truck or other means known in the art.

Referring still to FIG. 3, in some embodiments, the pipeline 110 may be fitted with permanently encoded magnetic waypoints 128 that may pass the exact position to the instrumented pig 200, as will be discussed herein below. The magnetic waypoints 128 may comprise a member of magnetically encoded material. The magnetically encoded material may contain global position data as determined by a global positioning system surveyed prior to installation on the pipeline 110 and pre-encoded with the global position data or other waypoint identification data, such as a waypoint number. When the instrumented pig 200 passes the magnetic waypoint 128, the position data may be passed to the instrumented pig 200, as will be explained herein below. The waypoints 128 may be passively activated, only responding when pinged by external sources, such as instrumented pig 200. In such instances the responding magnetic signal may communicate the data encoded on the waypoints 128.

Figure 4:
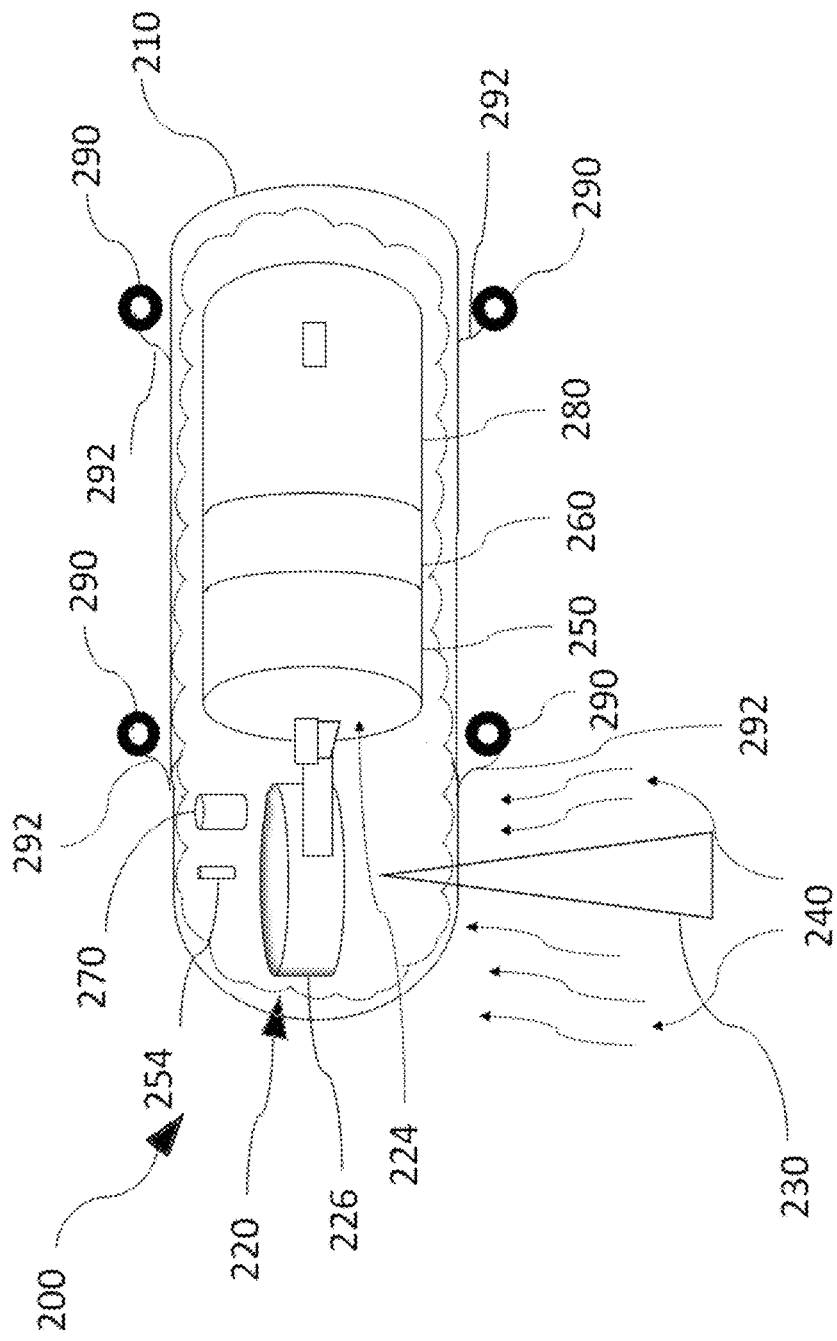
FIG. 4 is a view of an embodiment of an instrumented pig.

In some embodiments, the pipeline 110 may be operable to accommodate an instrumented pig 200. The instrumented pig 200 may be operable to travel within the pipeline 110. A cutout view of the instrumented pig 200 is shown in further detail in FIG. 4. The instrumented pig 200 may comprise an outer case 210. The outer case 210 may comprise any suitable material, such as, for example, stainless steel, aluminum, fiberglass, carbon composite, lexan, hard rubber, or a combination of these. Further, the outer case 210 may comprise multiple members, for example an upper member and a lower member, which are joined together and sealed shut, such that fluid cannot enter the interior of the instrumented pig 200. For example, if the working fluid 120 were water, the instrumented pig 200 would be sealed such that the instrumented pig 200 is waterproof. The instrumented pig 200 may be propelled, pushed, or driven through the pipeline 110 by the working fluid 120 being pumped through the pipeline 110 and effectively pushing the instrumented pig 200 through the pipeline 110. The pressure of the working fluid around the outside of the instrumented pig 200 may exceed 300 psi and the outer case 210 may withstand such pressures without fracture, leak, or any permanent deformation.

In some embodiments, instrumented pig 200 may comprise a control unit 224. The control unit 224 may be an automated, self-contained, and pre-programmed unit to provide instruction to other components of the acoustic sub-bottom profiler 220, as described herein below. The control unit may comprise a signal processor 250 and a memory 260 and may be operable to provide instruction and direction for the operation of an acoustic sub-bottom profiler 220, as described herein below.

In some embodiments, the instrumented pig 200 may comprise an acoustic sub-bottom profiler 220. The acoustic sub-bottom profiler 220 may comprise a transducer 226. The transducer 226 may operate in approximately the range of 25 kilohertz (KHz) to 45 KHz. The transducer 226 may be operable to act as a sound source. The transducer may release the pulse of acoustic energy 230. The transducer 226 may be coupled to the battery 280 and in some embodiments, a power amplifier, to produce the vibrational acoustic energy at the frequency of 25 KHz to 45 KHz to produce the pulse of acoustic energy 230.

The acoustic sub-bottom profiler 220 may be operably coupled to the control unit 224. The control unit 224 may be operable to provide instruction to the acoustic sub-bottom profiler 220, such as for example, the frequency at which to operate, the number of pulses sent, and how and when to transfer received and gathered data to the signal processor 250 and the memory 260.

The pulse of acoustic energy 230 may propagate in the direction the ground, such as ground 102 as illustrated in FIG. 1. The transducer 226 may produce multiple pulses of acoustic energy 230 per second. The pulse of energy 230 may be elongate in the fore-aft direction and is narrow across the path of travel. When new lithological features begin to be detected, such a pulse of acoustic energy and the corresponding reflections may provide an enhanced or better signal-to-noise ratio, making the lithological features, such as new tunnels easier to detected and identify.

The pulse of acoustic energy 230 may be reflected from the features underground and may create many pulses of reflected energy 240. The transducer 226 may be operable to receive the multiple pulses of reflected energy 230 per second. The intensity of the reflected energy may depend on the different densities of the ground and the features within the ground. Based on the time required for the pulses of reflected energy 240 to return to the transducer 226 and the intensity of the pulses of reflected energy 240, the processor 250 may image the lithology. For example, if the pulse of acoustic energy 230 encounters a solid formation, such as a rock, most of the acoustic energy will be reflected in the pulses of energy 240. If the pulse of acoustic energy 230 encounters a void, very little energy will be returned. Based on this information, the sub-bottom profiler 220 may be operable to image lithology from zero meters to 35 meters deep.

In some embodiments, the reflected energy 240 may travel back to the instrumented pig 200. The instrumented pig may capture the signal from the reflected energy 240 at a hydrophone array, wherein the hydrophone elements and the spacing between the elements are matched to the acoustic characteristics of the sound source. The hydrophone array may trail the acoustic pig and may be operably coupled to the acoustic sub-bottom profiler 220, the control unit 224, and the processor 250. The transducer 226 may be operably coupled to a signal processor 250. The signal processor 250 may amplify the signals from the reflected energy 240. The signal processor 250 may further process the signals such that they can be displayed in a readable format. This may include a visual representation of the lithological features of the strata, which may comprise earth, dirt, rock formations, and voids, such as tunnels, within the strata.

In some embodiments, the instrumented pig 200 may further comprise a memory 260 operably coupled to the processor 250 and to the sub-bottom profiler 220. The memory 260 may comprise a solid-state memory, flash memory, or other suitable memory. The memory 260 may be operable to store the raw data received by the ground imaging unit 220 and may be operable to store the image data produced by the processor 250.

In some embodiments, the instrumented pig 200 may further comprise a waypoint detector 254. The waypoint detector 254 may comprise a magnetically sensitive device that may read magnetically encoded data from magnetically encoded mediums, such as for example, waypoints 128. The waypoint detector 254 may be operable to detect the location of the magnetic waypoints 128 located on the pipeline 110. Upon passing a magnetic waypoint 128, the waypoint detector 254 may read the position data encoded on the magnetic waypoints 128. The waypoint detector 254 may be operably coupled to the processor 250. The waypoint detector 254 may convey the waypoint information to the processor 250. The processor 250 may be programmed with the pattern recognition necessary to decipher the pattern of information from the magnetic waypoints 128 that store the position data. The processor 250 may be operable to geocode lithological data with the data received from the waypoint detector 254.

In further embodiments, magnetic waypoints 128 may be encoded with alternative identifying information, such as a counter number or an identifying number, providing information such that the processor 250 could identify the location of the waypoint based on preloaded information.

In some embodiments, the instrumented pig 200 may alternatively comprise a global positioning system (GPS) receiver. The GPS receiver may be operable to receive information related to the position of instrumented pig 200 and may be operably coupled to the processor 250. The processor 250 may be operable to geocode lithological data with the data received from the GPS receiver.

In some embodiments, the instrumented pig 200 may further comprise a transceiver 270. The transceiver 270 may be operable to transmit and receive data signals. The transceiver 270 may be operably coupled to the processor 250. The transceiver 270 may be operable to transmit data, including geocoded data prepared by the processor 250 to an external receiver.

Signals may be transmitted from the transceiver 270 to an external transceiver 172, as illustrated in FIG. 1. The external transceiver 172 may be mounted on an exterior surface of the pipeline 110 at a point that is above the ground 102 or under the ground 102. In some embodiments, the external transceiver 172 may comprise multiple external transceivers, each operable to receive information from the transceiver 270 in the instrumented pig 200 when the instrumented pig 200 passes by the external transceiver 172. For example, the external transceiver 172 may be located at fixed intervals along the pipeline route consisting of every mile every 5 miles, every 10 miles, or any distance therebetween. The intervals between downloads may be roughly 9 or 10 minutes so that processing at a centralized facility may be completed in 10 or 15 minutes after the instrumented pig 200 completes the survey of a pipeline segment. The transceiver 172 may be operably connected to solar power generators, such as solar panels, which may be used to provide power to the transceiver 172

In some embodiments, the instrumented pig 200 may comprise a battery 280. The battery 280 may be supported by the outer case 210. In some embodiments, the battery 280 may be operably coupled to each of sub-bottom profiler 220, the processor 250, the waypoint detector 254, the data transceiver 270, and the memory 260. The battery 280 may comprise a rechargeable lithium-ion battery.

In some embodiments, the instrumented pig 200 may comprise at least one external guide 290 coupled to the outer side of the outer case 210. The at least one external guide 290 may comprise a wheel that may roll on an inner surface of a pipeline, such as pipeline 110 of FIG. 1. A wheel may be mounted on a bearing coupled to a strut 292, the strut 292 being coupled to the outer case 210. In further embodiments, the at least one external guide 290m may comprise a fin that may prevent the outer case 210 from contacting an inner surface of a pipeline, such as pipeline 110 of FIG. 1. In some embodiments, the at least one external guide 290 may comprise multiple external guides radially positioned about the outer case 210. In some embodiments, the at least one external guide 290 may further comprise multiple external guides longitudinally opposite from the at least one external guide, such that the instrumented pig 200 is supported near the front of the instrumented pig 200 and near the back of the instrumented pig 200.

Referring again to FIG. 1, in some embodiments, as discussed above, the system 100 may comprise the above-ground barrier 300. The above-ground barrier 300 may be adjacent to the pipeline 110. The above-ground barrier 300 may extend substantially parallel to the pipeline 110. In some embodiments the above-ground barrier 300 may be made from concrete, steel, wood, other common fence materials, or a combination thereof. The above-ground barrier 300 may extend beyond the pipeline 110.

In some embodiments, the above-ground barrier 300 may be operable to support the wall transceiver 310. The wall transceiver 310 may comprise a receiver and transmitter and may be operable to receive information from the external transceiver 172. In some embodiments, the external transceiver 172 may be connected to the wall transceiver 310 via a wired connection 320. In further embodiments, the data may be transmitted via a network, such as, for example, a 5G network. Similar to external transceiver 172, there may be multiple corresponding wall transceivers 310 to receive information from the external transceivers 172. The information may include geocoded data containing the location of subterranean lithological features, objects, and/or voids. Such voids may comprise tunnel 190. The tunnel 190 may comprise a man-made or naturally occurring tunnel. In some embodiments the tunnel 190 may be used to facilitate the transport of people and/or objects from one side of above-ground barrier 300 to an opposite side of barrier 300.

The transceiver 310 may further be operable to communicate with a central server, located distally from the fence 300. The transceiver 310 may communicate with the central server via a wired connection, such as a fiber optic connection, or via a cellular connection, such as a 5G connection. The central server may be accessed by border enforcement personnel. Any data transferred may be further processed after receipt at the central server.

Figure 5:
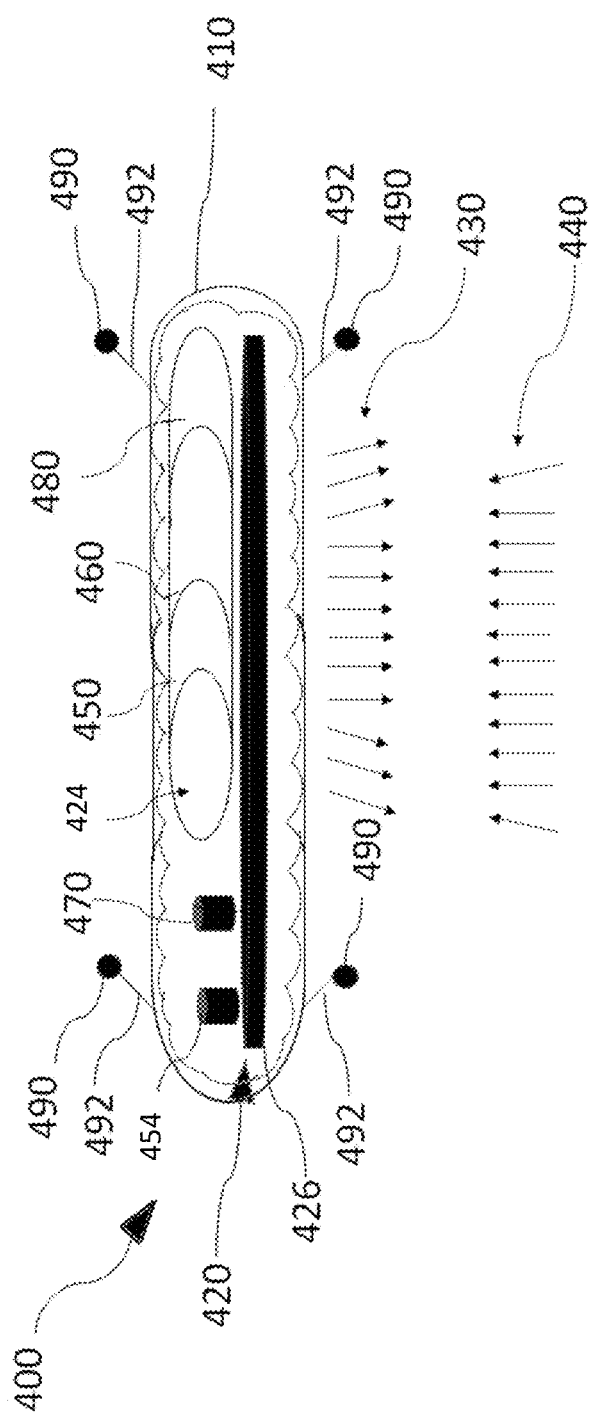
FIG. 5 is a view of an embodiment of an instrumented pig.

Further embodiments of the invention may include an instrumented pig as shown in FIG. 5. FIG. 5 illustrates a cutout view of an instrumented pig 400. The instrumented pig 400 may be operable to travel within a pipeline, such as pipelines described herein. The instrumented pig 400 may further be operable to send data to external receivers and receive data from external sources, similar to external receivers and sources described herein above. The instrumented pig 400 may comprise an outer case 410. The outer case 410 may comprise any suitable material, such as, for example, fiberglass, rubber, carbon composite, lexan, or a combination of these. Further, the outer case 410 may comprise multiple members, for example an upper member and a lower member, which are joined together and sealed shut, such that fluid cannot enter the interior of the instrumented pig 400. For example, if the working fluid in a pipeline were water, the instrumented pig 400 would be sealed such that the instrumented pig 400 is waterproof to water pressures exceeding 300 psi.

In some embodiments, the instrumented pig 400 may comprise a ground penetrating radar (GPR) 420. The GPR 420 may comprise a control unit 424. The control unit 424 may be an automated, self-contained, and pre-programmed unit to provide instruction to other components of the GPR 420, as described herein below.

The GPR 420 may further comprise a transmission antenna 426. The transmission antenna 426 may operate in approximately the range of 100 Megahertz (MHz). In some embodiments, the transmission antenna may operate anywhere in the range of 10 MHz to 200 MHz. The transmission antenna 426 may be operable to produce an electromagnetic signal 430, the electromagnetic signal 430 being operable to image lithological strata and voids within the strata beneath and around the instrumented pig 400. The transmission antenna 426 may operate at 100 to 200 MHz and may be fully contained within the outer case 410.

The electromagnetic signal 430 may be projected into the ground. The electromagnetic signal 430 may be broad across the direction of travel, that is, perpendicular to the pipeline and very narrow in the direction of travel. Upon the electromagnetic signal 430 striking an object, the electrical conductivity and magnetic resonance of the object reflects, refracts, and scatters the electromagnetic signal 430. The antenna 426 may further comprise a receiver, or receiver antenna. The antenna 426 may be operable to receive the reflected, refracted, and scattered electromagnetic signals, referred to herein as reflected electromagnetic signals 440. The reflected electromagnetic signals 440 may comprise the same beam pattern as the electromagnetic signal 430. The GPR 420 may be useful in lithology that is dry and contains a minimal amount of salt. The GPR 420 may be effective at depths ranging from zero meters to 30 meters under those favorable conditions.

The antenna 426 may be operably coupled to the control unit 424. The control unit 424 may provide instruction to the antenna regarding the frequency at which to generate electromagnetic signals and when and how to transfer data to the signal processor 450 and the memory 460.

The control unit 424 may operably coupled to a signal processor 450. The signal processor 450 may amplify the signals from the reflected signals 440. The signal processor 450 may further process the signals such that they can be displayed in a readable format. This may include a visual representation of the lithological features of the strata, which may comprise earth, dirt, rock formations, and voids within the strata.

In some embodiments, the control unit 424 may further comprise a memory 460 operably coupled to the signal processor 450 and to the GPR 420. The memory 460 may comprise a solid-state memory, flash memory, or other suitable memory. The memory 460 may be operable to store the raw data received by the GPR 420 and may be operable to store the image data produced by the processor 450.

In some embodiments, the instrumented pig 400 may further comprise a waypoint detector 454. The waypoint detector 454 may be operable to detect the location of the magnetic waypoints located on a corresponding pipeline. Upon passing a magnetic waypoint on the corresponding pipeline, the waypoint detector 454 may read the position data encoded on the magnetic waypoints. The waypoint detector 454 may be operably coupled to the processor 450. The waypoint detector 454 may convey the waypoint information to the processor 450. The processor 450 may be programmed with the pattern recognition necessary to decipher the pattern of information from the magnetic waypoints that store the position data. The processor 450 may be operable to geocode lithological data with the data received from the waypoint detector 454.

In some embodiments, the instrumented pig 400 may further comprise a global positioning system (GPS) receiver. The GPS receiver may be operable to receive information related to the position of the instrumented pig 400 and may be operably coupled to the processor 450. The processor 450 may be operable to geocode lithological data with the positioning data received from the GPS receiver 454.

In some embodiments, the instrumented pig 400 may further comprise a GPR data transceiver 470. The GPR data transceiver 470 may be operable to transmit and receive signals. Signals may be transmitted to an external receiver. The GPR data transceiver 470 may be operably coupled to the processor 450. The transceiver 470 may be operable to transmit data prepared by the processor 450 to an external receiver.

In some embodiments, the instrumented pig 400 may comprise a battery 480. The battery 480 may be supported by the outer case 410. In some embodiments, the battery 480 may be operably coupled to each of sub-bottom profiler 420, the processor 450, the GPS receiver 454, the transceiver 470, and the memory 460. The battery 480 may be a rechargeable battery. The battery 480 may be a lithium-ion battery.

In some embodiments, the instrumented pig 400 may comprise at least one external guide 490 coupled to the outer side of the outer case 410. The at least one external guide 490 may comprise a wheel that may roll on an inner surface of a pipeline. A wheel may be mounted on a bearing coupled to a strut 492, the strut 492 being coupled to the outer case 410. In further embodiments, the at least one external guide may comprise a fin that may prevent the instrumented pig 400 from contacting an inner surface of a pipeline. In some embodiments, the at least one external guide 490 may comprise multiple external guides radially positioned about the outer case 410. In some embodiments, the at least one external guide 490 may further comprise multiple external guides longitudinally opposite from the at least one external guide, such that the instrumented pig 400 is supported near the front of the instrumented pig 400 and near the back of the instrumented pig 400.

In some embodiments of a subterraneous object detection system, in cases where a second tank is not possible, a pipeline may further comprise a fluid outlet located at either end of the pipeline. In some embodiments, the fluid outlet may act to return a working fluid to the fluid supply. The fluid outlet may comprise a second pipeline with fluid flowing in the direction opposite the direction of flow within pipeline. In some embodiments, the fluid outlet may be coupled to the fluid supply, with means to prevent the working fluid from flowing back into the second pipeline, such as, for example, a check valve. In some embodiments, the pipeline may comprise a second pump located on the second pipeline operable to pump the working fluid back to the fluid supply. In further embodiments, the fluid outlet may allow the working fluid to exit from an opening in the second pipeline 162 and be deposited in the ground.

Figure 6:
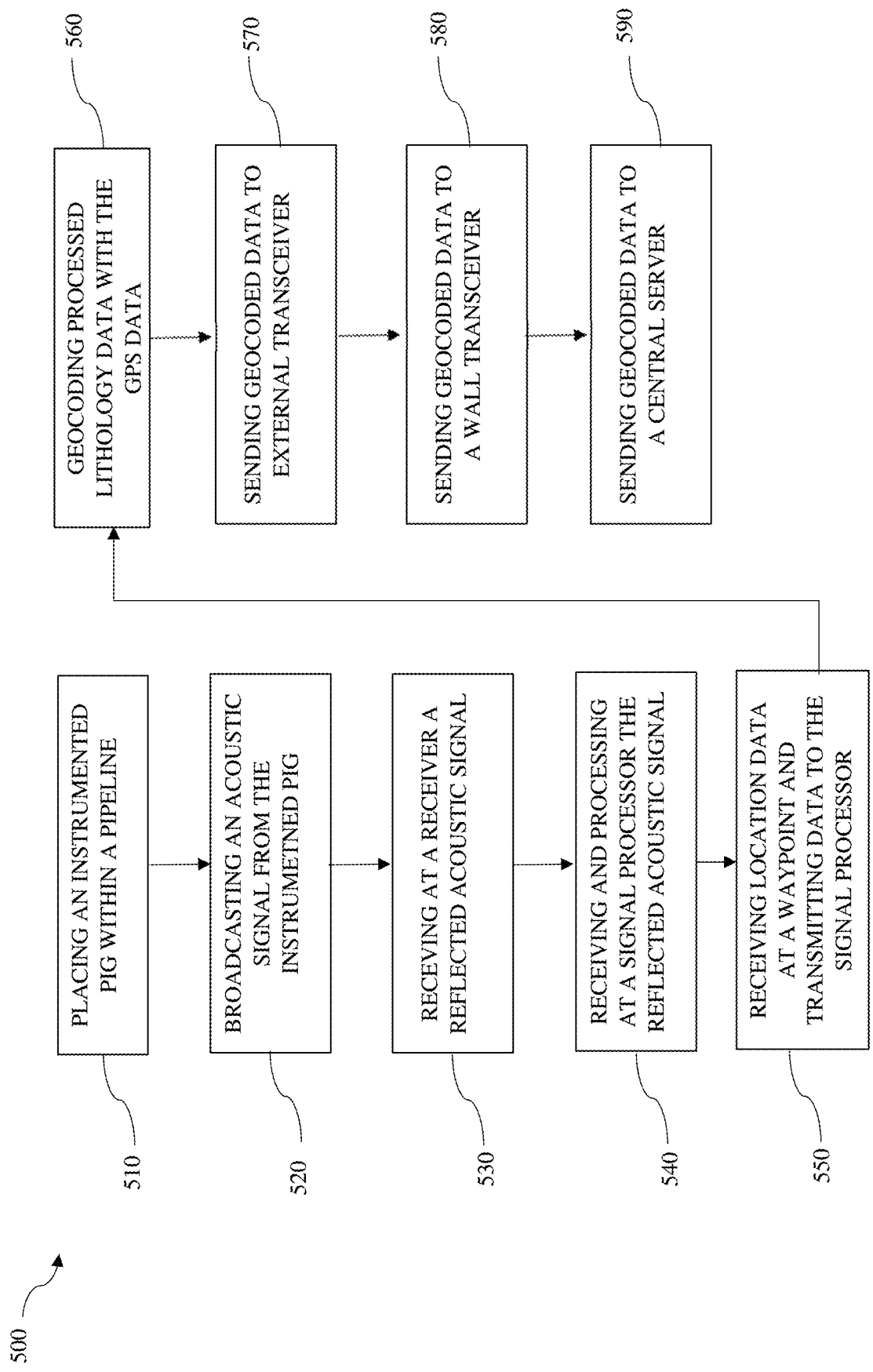
FIG. 6. illustrates a flow chart representing a method of imaging lithological strata and voids within the strata beneath the ground.

Referring now to FIG. 6, a method 500 of detecting a subterranean object is disclosed. The method may include step 510, locating or placing an instrumented pig within a pipeline. The pipeline may comprise various elements, similar to those already described herein. The instrumented pig may be placed inside the pipeline via an opening created when a first access panel is opened. A first control unit may communicate with a first pump. The first control unit may provide an instruction to the first pump to begin pumping a working fluid. The first control unit may be pre-programmed with instruction or may receive instruction from a remote location via wired communication, or, in some embodiments, via wireless communication. The wireless communication may occur via a wireless network, such as a cellular network. In some embodiments, the first pump may also be coupled to a float switch and may be activated or deactivated as the float switch is activated or deactivated.

The working fluid may comprise water or other fluids already described herein. Upon receiving instruction from the first control unit or the float switch, the pump may begin pumping the working fluid through the pipeline. The working fluid may be operable to push or propel the instrumented pig through the pipeline.

In some embodiments, the method may comprise 520, the instrumented pig producing and broadcasting an acoustic signal. The instrumented pig may comprise an acoustic sub-bottom profiler. The acoustic sub-bottom profiler may comprise a transducer. The transducer may comprise a boom plate operable to convert electric energy to acoustic energy and may broadcast the acoustic energy from the instrumented pig through the pipeline and into the ground. The transducer may be coupled to a rechargeable lithium-ion battery within the instrumented pig.

The method may comprise the acoustic signal being reflected by lithological features located within the strata beneath the pipeline. The lithological features may include features such as solid objects and voids, both naturally occurring and man-made. Such objects may include madmade or natural tunnels being used to bring items and people across a border subterraneously. The acoustic signal may reflect off of such lithological features and may created reflected and refracted acoustic signals.

In some embodiments, the method may further comprise 530 receiving at a receiver a reflected acoustic signal. The transducer may comprise a receiver and may receive and capture the reflected acoustic signals.

In some embodiments the method may comprise 540 processing at a signal processor the reflected acoustic signal. The instrumented pig may comprise a signal processor coupled to the transducer and to the battery. The signal processor may be operable to process the received acoustic signals into a form that is readable. In some embodiments the processor may be coupled to a memory, such as a flash memory or solid-state memory, and may store the received and/or processed data in the memory.

In some embodiments, the method may comprise 550 receiving global positioning system (GPS) data. The instrumented pig may comprise a waypoint detector. The method may comprise the waypoint detector reading the magnetically encoded information found on waypoints which have been preprogrammed and magnetically encoded and fixed to the pipeline. The method may include programming and encoding the GPS data, specifically the GPS location of the waypoint, on each waypoint. The method may include the instrumented pig passing by the waypoints and reading the encoded GPS location data. The waypoint detector may be operably coupled to the processor. The method may include the waypoint detector sending the information to the signal processor.

In other embodiments the method may further comprise receiving GPS location data at a GPS receiver within the instrumented pig. The GPS receiver may be operably coupled to the battery and to the processor. A method may comprise the GPS receiver receiving GPS location data of the instrumented pig and communicating the GPS location data to the processor.

In some embodiments, the method may further include 560, the processor geocoding the processed lithology data with the GPS data. The method may include the processor interpolating the position of any lithological feature based on the position of one or more way points and the estimated speed of the instrumented pig.

In some embodiments, the method may further include 570, sending geocoded data to an external receiver. The method may further comprise the signal processor being in communication with a transceiver within the instrumented pig. The method may comprise the transceiver sending the geocoded information to an external transceiver coupled to the outside of the pipeline. The method may the instrumented pig passing the external transceiver and wirelessly transmitting the geocoded information to the external transceiver.

The method may further include 580, sending the geocoded data from the external transceiver to a wall transceiver. The wall transceiver may be mounted on an above the ground barrier adjacent to the pipeline. The wall transceiver may be wired to the external transceiver and the method may include sending the geocoded data at regular intervals.

The method may further comprise 590, sending the geocoded data to a central server. The method may include the wall transceiver being operably coupled to a central server and may comprise the wall transceiver to be connected via a wired connection, such as a fiber optic connection, or via a wireless connection, such as a 5G connection.

The method may comprise further steps. For example, the method may comprise providing, near the first tank, a watering station. The method may comprise treating the working fluid via a filter, chemical treatment, and/or treatment via ultraviolet light, to provide potable water. The method may further comprise providing a means to persons to receive water from the system, such as a drinking fountain or faucet.

The method may further comprise extracting the instrumented pig from the pipeline via a second access panel at the end of the pipeline. The method may further comprise rotating the instrumented pig 180 degrees and placing the instrumented pig into the pipeline.

The method may further comprise extracting the instrumented pig from the pipeline via a first access panel at the beginning of the pipeline. The method may further comprise rotating the instrumented pig 180 degrees and placing the instrumented pig into the pipeline.

The method may further comprise providing a second storage tank at the end of the pipeline. The method may comprise directing the working fluid at the end of the pipeline to the second storage tank. The method may further comprise pumping the fluid from the second storage tank into the pipeline flowing in the direction of the beginning of the pipeline, where the first storage tank is located, using a second pump controlled be a second control unit. The method may include the instrumented pig collecting and transmitting geocoded lithological data as the instrumented pig travels toward the beginning of the pipeline.

The method may further include providing an intermediate pump at a midpoint of the pipeline to compensate for the friction losses between the pipeline and the working fluid. The method may further comprise a first valve receiving a signal from the first control unit or the second control unit to open and redirect the instrumented pig, such that the instrumented pig bypasses the intermediate pump. The method may comprise a second valve receiving a signal from the first control unit or the second control unit to open and redirect the instrumented pig such that the instrumented pig returns to the main flow of the pipeline. The method may comprise the first valve and the second valve receiving signals from the first control unit and/or the second control unit to open and/or close.

The method may further comprise the instrumented pig receiving lithological imaging data via a ground penetrating radar unit. The method may comprise the ground penetrating radar unit producing an electromagnetic signal at an antenna operating at approximately 100 MHz-200 MHz and operable to transmit an electromagnetic signal. The method may further comprise receiving a reflected electromagnetic signal at the antenna.

EMBODIMENTS

A first embodiment may include a subterranean object detection system, comprising a pipeline operable to conduct a working fluid, and an instrumented pig operable to travel within the pipeline and operable to image lithological strata and voids within the strata beneath and around the pipeline. The instrumented pig may comprise an outer case, a battery coupled to the outer case, a ground imaging unit operable to send a signal to image the lithological strata and voids within the strata beneath and around the pipeline and is operable to receive a reflected signal indicating lithology data, wherein the ground imaging unit is operably coupled to the battery.

A second embodiment may include the system of embodiment 1, wherein the pipeline further comprises at least one preprogrammed magnetically coded waypoint and wherein the instrumented pig may comprise a waypoint detector operable to read data from the magnetically coded waypoint.

A third embodiment may include the system of embodiment 1, wherein the instrumented pig may comprise a global positioning system (GPS) locator and telemetry transmitter operably coupled to the battery and to the ground imaging unit.

A fourth embodiment may include the system of embodiment 2 or of embodiment 3, wherein the instrumented pig may further comprise a signal processor operably coupled to ground imaging unit and to one of the waypoint detectors and the GPS receiver. The signal processor may be operable to geocode data gathered from the ground imaging unit with data received from one of the waypoint detectors and the GPS locator.

A fifth embodiment may include the system of embodiment 4, and may further comprise a data transceiver operable to receive data from each of the signal processor, ground imaging unit, and from the one of the waypoint detector and GPS locator, and may be further operable to send data to an external receiver.

A sixth embodiment may include the system of embodiment 5, wherein the instrumented pig may further comprise at least one external guide coupled to an outside of the outer case.

A seventh embodiment may include the system of embodiment 6, wherein the ground imaging unit may comprise an acoustic sub-bottom profiler. The acoustic sub-bottom profiler may comprise a transducer operable to project an acoustic signal into the ground. The acoustic signal may be operable to create a reflected signal upon encountering objects within strata. The transducer may further be operable to receive the reflected signal, wherein the signal processor may be operable to process the reflected signal.

An eighth embodiment may include the system of embodiment 7. The ground imaging unit may comprise a ground penetrating radar. The ground penetrating radar may comprise a transmission antenna operable to produce an electromagnetic signal propagating into the ground, a receiving antenna operable to receive a reflected electromagnetic signal, wherein the signal processor is operable to process the reflected electromagnetic signal.

A ninth embodiment may include the system of embodiment 7 or 8, which may further comprise at least one pump coupled to the pipeline operable to pump the working fluid through the pipeline.

A tenth embodiment may include the system of embodiment 9, wherein the pipeline comprises a high-density polyethylene pipe.

An eleventh embodiment may include the system of embodiment 10, wherein the pipeline is at least partially buried in the ground.

A twelfth embodiment may include system of embodiment 11, wherein the pipeline may further comprise multiple sections coupled together, at least one access panel operable to open and close and operable to allow the instrumented pig to be removed, and at least one watering station.

A thirteenth embodiment may include the system of embodiment 12, wherein the subterranean object may comprise a tunnel.

An fourteenth embodiment may include the system of embodiment 9, further comprising: a fence adjacent to the pipeline, wherein the fence is operable to support a transceiver, wherein the transceiver is operable to communicate with a central server, and wherein the data transceiver is operable to transmit data to the transceiver on the wall and operable to receive data from the data acquisition system on the wall.

A fifteenth embodiment may include an instrumented pig, comprising an outer case, a rechargeable battery coupled to the outer case, an acoustic sub-bottom profiling unit operable to image lithology beneath and around the pig. The acoustic sub-bottom profiling unit is operably coupled to the rechargeable battery. The acoustic sub-bottom profiling unit may comprise a transducer operable to produce an acoustic pulse directed to ground strata and wherein lithological features and voids within the strata create a reflected acoustic pulse. The transducer of the acoustic sub-bottom profiling unit may be operable to receive the reflected acoustic pulse. The instrumented pig may further comprise a waypoint detector operable to read from a preprogrammed magnetic waypoint external to the instrumented pig a global positioning system location of the magnetic waypoint.

A sixteenth embodiment may include the system of embodiment 15, further comprising a signal processor operably coupled to the acoustic sub-bottom profiling unit.

A seventeenth embodiment may include the instrumented pig of embodiment 16, wherein the signal processor is operable to geocode data gathered from the acoustic sub-bottom profiling unit with data received from the GPS receiver.

An eighteenth embodiment may include the instrumented pig of embodiment 17, further comprising a data transceiver operably coupled to the signal processor and the rechargeable battery and operable to send data to an external transceiver and further operable to receive data from an external transceiver.

A nineteenth embodiment may include the instrumented pig of embodiment 18, wherein the instrumented pig further comprises at least one external guide coupled to an outside of the outer case.

A twentieth embodiment may include method of detecting a subterranean object. The method may comprise broadcasting an acoustic signal from an acoustic sub-bottom profiler contained within an instrumented pig, the instrumented pig traveling within a pipeline. The method may include, receiving, at a receiver within the acoustic sub-bottom profiler, a reflected acoustic signal, receiving, at a signal processor the acoustic signal, processing, at the signal processor, the reflected acoustic signal, receiving, at a waypoint detector from a preprogrammed magnetic waypoint, a location data, such global positioning system (GPS) data, receiving, at the signal processor, the location data, and geocoding a processed lithology data with the location location.

A twenty-first embodiment may include the method of embodiment 20, further comprising sending, by a transmitter, a geocoded processed lithology data to a receiver external to the instrumented pig, receiving, by a receiver on a wall adjacent to the pipeline, the geocoded processed lithology signal, and sending the geocoded processed lithology data to a central server.

Unless otherwise specified, the term "substantially" means within 5% or 10% of the value referred to or within manufacturing tolerances. Unless otherwise specified, the term "about" means within 5% or 10% of the value referred to or within manufacturing tolerances.

The conjunction "or" is inclusive.

The terms "first", "second", "third", etc. are used to distinguish respective elements and are not used to denote a particular order of those elements unless otherwise specified or order is explicitly described or required.

Numerous specific details are set forth to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained in software to be used in programming or configuring a computing device.

Embodiments of the methods disclosed may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A subterranean object detection system, comprising:
   a pipeline operable to conduct a working fluid, the pipeline comprising at least one passively activated waypoint; and
   an instrumented pig operable to travel within the pipeline and operable to image lithological strata and voids within the strata beneath and around the pipeline, the instrumented pig comprising:
   an outer case;
   an acoustic sub-bottom profiler, the acoustic sub-bottom profiler comprising a transducer operable to project an acoustic signal into the strata, the acoustic signal being operable to create a reflected signal, the transducer being further operable to receive the reflected signal; and
   a control unit comprising:
   a memory;
   a signal processor coupled with the transducer; and
   a transceiver operable to be in communication with an external source;
   a waypoint detector operable to read global positioning system (GPS) data from the passively activated waypoint, wherein the instrumented pig is operable to activate the at least one passively activated waypoint;
   wherein the control unit is operable to provide to the instrumented pig at least one of pre-programmed instruction and instruction received from the external source.

2. The system of claim 1, wherein the instrumented pig further comprises:
   a signal processor operably coupled to the acoustic sub-bottom profiler and to the waypoint detector, wherein the signal processor is operable to geocode data gathered from the acoustic sub-bottom profiler with data received from the waypoint detector.

3. The system of claim 2, further comprising a data transceiver operable to receive data from each of the signal processor, the acoustic sub-bottom profiler, and the waypoint detector, and is further operable to send data to an external receiver.

4. The system of claim 3, wherein the instrumented pig further comprises at least one external guide coupled to an outside of the outer case.

5. The system of claim 3, further comprising a first pump coupled with the pipeline at a first end of the pipeline, wherein the first pump is operable to pump the working fluid through the pipeline.

6. The system of claim 5, wherein the pipeline comprises a high-density polyethylene pipe.

7. The system of claim 6, wherein the pipeline is at least partially buried in the ground.

8. The system of claim 7, wherein the pipeline further comprises: multiple sections coupled together; and
at least one access panel operable to open and close and operable to allow the instrumented pig to be removed.

9. The system of claim 8, wherein the subterranean object comprises a tunnel.

10. The system of claim 5, further comprising: a transceiver, wherein the transceiver is operable to communicate with a central server, and wherein the transceiver is operable to transmit data to the transceiver and the data transceiver is operable to receive data from the transceiver.

11. The system of claim 5, further comprising a second pump at a second end of the pipeline.

12. The system of claim 11, further comprising a working fluid reservoir adjacent to the second end of the pipeline, wherein the second pump is operable to pump fluid from the reservoir.

13. An instrumented pig, comprising:
an outer case;
a ground imaging unit operable to send a signal to image the strata and voids within the ground strata beneath and around the pipeline and is operable to receive a reflected signal indicating lithology data; and
a waypoint detector operable to read and receive global positioning system data from an external waypoint.

14. The instrumented pig of claim 13, further comprising a signal processor operably coupled to the ground imaging unit.

15. The instrumented pig of claim 14, wherein the signal processor is operable to geocode data gathered from the ground imaging unit with data received from the waypoint detector.

16. The instrumented pig of claim 15, further comprising a data transceiver operably coupled to the signal processor and operable to send data to an external transceiver and further operable to receive data from an external transceiver.

17. The instrumented pig of claim 16, wherein the instrumented pig further comprises at least one external guide coupled to an outside of the outer case.

18. A method of detecting a subterranean object, the method comprising:
broadcasting a signal from a ground imaging unit contained within an instrumented pig, the instrumented pig traveling within a pipeline;
receiving, at a receiver within the ground imaging unit a reflected signal;
receiving, at a signal processor, the reflected signal;
processing, at the signal processor, the reflected signal;
receiving from a passively activated magnetic encoded waypoint, at a waypoint detector, a location data;
receiving, at the signal processor, the location data; and
geocoding a processed lithology data with the location data.

19. The method of claim 18, further comprising:
sending, by a transmitter, a geocoded processed lithology data to a receiver external to the instrumented pig;
receiving, by a receiver on a wall adjacent to the pipeline, the geocoded processed lithology signal; and
sending the geocoded processed lithology data to a central server.

* * * * *